(No Model.)

D. LUBIN.
PIN.

No. 257,351. Patented May 2, 1882.

Witnesses,
Edwin L. Yewell,
H. Aubrey Toulmin

Inventor,
David Lubin.
By C. M. Alexander,
his Atty.

UNITED STATES PATENT OFFICE.

DAVID LUBIN, OF SACRAMENTO CITY, CALIFORNIA, ASSIGNOR OF ONE-HALF TO HARRIS WEINSTOCK, OF SAME PLACE.

PIN.

SPECIFICATION forming part of Letters Patent No. 257,351, dated May 2, 1882,

Application filed February 1, 1882. (No model.)

*To all whom it may concern:*

Be it known that I, DAVID LUBIN, of Sacramento City, in the county of Sacramento, and in the State of California, have invented certain new and useful Improvements in Pins; and I do hereby declare that the following is a full, clear, and exact description thereof, reference being had to the accompanying drawings, and to the letters of reference marked thereon, making a part of this specification.

This invention relates to certain new and useful improvements in pins for holding or fastening garments together; and it consists, first, in so forming the head thereof that its upper or outer surface will conform as nearly as possible to the shape or configuration of the finger, that the pin may be forced into unusually thick and heavy goods with little or no serious discomfort to the operator; and, secondly, in so forming or shaping the shank of the pin that it will offer the least possible resistance in its passage through the goods.

Figure 1:
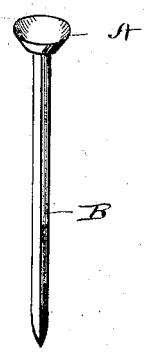
Figure 2:
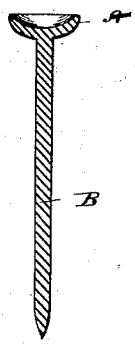
Figure 3:
Figure 4:

In the accompanying drawings, forming a part of this specification, and on which like letters of reference indicate similar parts, Figure 1 is a perspective view of my improved pin. Fig. 2 is a vertical sectional view of the same. Fig. 3 is a cross-section thereof; and Fig. 4, a perspective view of a modification of my device, showing the improved concaved head and the ordinary cylindrical point or shank.

The letter A designates the head of the pin, which is of about the usual diameter, or which may be, if found preferable, somewhat larger than is ordinarily used, the upper or outer face whereof is concaved, as shown. The degree of this concavity is regulated according to the size of the head and shank of the pin; but in no case is it so deep or of so short a radius as to present a sharp periphery to the head, as the latter would frustrate the object and aim of my invention, which is to so curve the concavity as to resemble the configuration or shape of the finger as nearly as practicable, and to avoid the unpleasant and sometimes serious effect of forcing a pin through heavy material or several layers of lighter goods. The head of a pin as ordinarily constructed, by reason of its convexity, forms practically a blunt point, the tendency and actual result of which is, when pressed hard upon by the finger, to part the skin and force its way into the same. The opposite to this result is the effect produced by using my improved pin-head, for as the old pin-head, as above stated, parts the skin and works its way into the same, so by mine, owing to its being of the opposite shape, the opposite result is effected and the skin gathered and drawn together, and the whole diameter of the head utilized in this the object for which it is really intended.

The letter B indicates the shank of the pin, which forms the second part of my invention, and which is grooved longitudinally on its sides, forming in cross-section an equilateral triangle whose sides or faces are curved or concaved, the corners or edges whereof are sufficiently reduced to prevent cutting the goods by reason of any sharpness.

The old or ordinary pin shank or body, being cylindrical in form, has a greater area in cross-section than a shank made according to my invention of the same diameter, which, having less area, consequently necessarily offers less resistance while being forced into the goods. Further, a pin-shank constructed in the manner herein claimed and set forth is also stronger, and therefore much less liable to bend than that constructed after the manner of the old form. Hence another improved result attending the use of my invention. In some instances, however, I may desire to use the cylindrical shank and my improved concave head combined, or my triangular concaved pin-shank and the ordinary convexed or common pin-head.

Having thus fully described my invention and its objects and advantages, and having pointed out wherein it is distinguished from what has heretofore been known, what I desire to claim and secure by Letters Patent is—

1. As a new article of manufacture, a pin for holding garments together, having its head concaved on the upper face thereof and its shank or body of triangular form in cross-section and longitudinally grooved, as shown and described.

2. As a new article of manufacture, a pin for holding garments, having a triangular shank in cross-section and longitudinally grooved, as shown and described.

In testimony whereof I affix my signature, in presence of two witnesses, this 31st day of January, 1882.

DAVID LUBIN.

Witnesses:
 CHAS. D. DAVIS,
 H. AUBREY TOULMIN.